United States Patent
Mion et al.

(10) Patent No.: US 9,886,520 B2
(45) Date of Patent: Feb. 6, 2018

(54) EXPOSING RELATIONSHIPS BETWEEN UNIVERSE OBJECTS

(71) Applicants: Gilles Vergnory Mion, Vaucresson (FR); Olivier Tsoungui, Viry Chatillon (FR); Christian Ah-Soon, Colombes (FR)

(72) Inventors: Gilles Vergnory Mion, Vaucresson (FR); Olivier Tsoungui, Viry Chatillon (FR); Christian Ah-Soon, Colombes (FR)

(73) Assignee: Business Objects Software Ltd., Dublin (IE)

(*) Notice: Subject to any disclaimer, the term of this patent is extended or adjusted under 35 U.S.C. 154(b) by 464 days.

(21) Appl. No.: 14/032,510

(22) Filed: Sep. 20, 2013

(65) Prior Publication Data

US 2015/0088874 A1    Mar. 26, 2015

(51) Int. Cl.
*G06F 17/30* (2006.01)

(52) U.S. Cl.
CPC .. *G06F 17/30958* (2013.01); *G06F 17/30011* (2013.01); *G06F 17/30424* (2013.01); *G06F 17/30607* (2013.01)

(58) Field of Classification Search
CPC ......... G06F 17/30598; G06F 17/30589; G06F 17/30991; G06F 17/30011; G06F 17/30424; G06F 17/30657; G06F 17/30867
USPC ......... 707/737, 707, E17.108, 722, E17.046, 707/E17.089, 730, E17.014, E17.09, 707/E17.141, 639, 706, 709, 723, 738, 707/754, 755, 758, 770, 776; 705/14.53, 705/14.49, 14.54, 3, 7.32, 14.42, 14.66, 705/14.67, 1.1, 2, 26.1, 26.41, 26.61, 705/26.7, 26.9, 318, 44, 7.24, 7.27, 7.29, 705/7.31, 7.39, 7.42; 706/52, 12, 46, 16; 709/202, 203, 223, 204, 217, 218, 221, 709/226, 201, 219, 220, 224
See application file for complete search history.

(56) References Cited

U.S. PATENT DOCUMENTS

| | | | |
|---|---|---|---|
| 5,555,403 A | 9/1996 | Cambot et al. | |
| 5,812,840 A | 9/1998 | Shwartz | |
| 6,418,427 B1* | 7/2002 | Egilsson | G06F 17/30592 |
| 6,609,123 B1 | 8/2003 | Cazemier et al. | |
| 7,647,298 B2 | 1/2010 | Adya et al. | |
| 7,685,146 B2 | 3/2010 | Wu et al. | |
| 7,702,649 B1 | 4/2010 | Bresch et al. | |
| 7,970,777 B2 | 6/2011 | Saxena et al. | |
| 8,086,592 B2 | 12/2011 | Mion et al. | |

(Continued)

OTHER PUBLICATIONS

Communication and European Search Report from EPO—Germany dated Jan. 29, 2015 re EP Application No. 14002801.0-1952; 6 pages.

(Continued)

*Primary Examiner* — Jay Morrison
*Assistant Examiner* — Ken Hoang
(74) *Attorney, Agent, or Firm* — Fish & Richardson P.C.

(57) ABSTRACT

Methods, systems, and computer-readable storage media for exposing relationships between universe objects. In some implementations, actions include identifying a universe, the universe including objects at an abstracted layer, automatically processing the objects of the abstracted layer to provide one or more link groups, each link group including a plurality of objects that have some relation to one another, and outputting the one or more link groups.

20 Claims, 9 Drawing Sheets

(56) References Cited

U.S. PATENT DOCUMENTS

| | | | |
|---|---|---|---|
| 8,229,952 B2 | 7/2012 | Cras et al. | |
| 9,245,022 B2* | 1/2016 | Bau | G06F 17/30657 |
| 2005/0149550 A1* | 7/2005 | Berger | G06F 17/30592 |
| 2008/0071799 A1 | 3/2008 | Evans et al. | |
| 2008/0104060 A1* | 5/2008 | Abhyankar | G06F 17/30643 |
| 2009/0100360 A1 | 4/2009 | Janzen et al. | |
| 2009/0193004 A1 | 7/2009 | Reynolds et al. | |
| 2010/0191718 A1 | 7/2010 | Coriell et al. | |
| 2010/0313127 A1* | 12/2010 | Gosper | G06F 17/246 715/708 |
| 2012/0323950 A1 | 12/2012 | Wilson et al. | |
| 2013/0073537 A1 | 3/2013 | Simon et al. | |
| 2013/0117323 A1 | 5/2013 | Lohiya et al. | |
| 2013/0339379 A1* | 12/2013 | Ferrari | G06F 17/30595 707/766 |
| 2014/0270547 A1* | 9/2014 | Dwan | G06K 9/00684 382/224 |

OTHER PUBLICATIONS

Rennison, E: "Galaxy of News. An approach to visualizating and understanding expansive news landscapes", UIST. Proceeding sof the Annual ACM Symposium on User Interfacesoftware and Technology, Nov. 2, 1994, pp. 3-12, SP002233435, w/Abstract.

U.S. Appl. No. 13/733,531, filed Jan. 3, 2013, Ah-Soon et al.

* cited by examiner

EXPOSING RELATIONSHIPS BETWEEN UNIVERSE OBJECTS

BACKGROUND

Computer-implemented reporting tools enable users to query databases through various technologies supported by their respective middleware applications and services. Generally, each query may be performed upon a single database or data source. For example, business object universes, as well as universes that contain business objects, e.g., SAP BusinessObjects Universe provided by SAP AG of Walldorf, Germany, have been created to hide relational database complexity, e.g., their specific tables and columns, and to enable users to search and to query universes based on particular business objects the universes contain or are otherwise associated with.

In some instances, obscuring the complexity can result in incorrect usage. For example, objects can be displayed in a hierarchical tree created by a universe designer. In addition to business views, the tree organization may be the only organizational semantic proposed to the end user. A business view includes a subset of objects defined for the universe. For example, and for a given universe, an example business view entitled "Sales" might only include objects related to sales, and an example business view entitled "HR" might only include objects related to human resources.

An end user who creates a query on top of this universe might have no other guidance about meaningful queries that can be created. For example, the end user can select objects to create a query. If the selected objects are not related, a best case result can include return of a Cartesian product, and a worst case result can include an error message.

SUMMARY

Implementations of the present disclosure include computer-implemented methods for exposing relationships between universe objects. In some implementations, actions include identifying a universe, the universe including objects at an abstracted layer, automatically processing the objects of the abstracted layer to provide one or more link groups, each link group including a plurality of objects that have some relation to one another, and outputting the one or more link groups.

In some implementations, automatically processing the objects includes mapping the objects of a universe to one or more data sources in a data foundation underlying the data universe.

In some implementations, automatically processing the objects includes, for a dimension of an object, determining that one or more attributes are associated with the dimension, and in response, providing a link group based on the dimension and the one or more attributes.

In some implementations, the link group includes a semantic link group that provides at least one dimension-attribute relationship.

In some implementations, at least one link group of the one or more link groups includes a data link group.

In some implementations, the at least one link group expresses at least one of a dimension-to-dimension relationship and a dimension-to-measure relationship.

In some implementations, outputting the link groups includes providing the link groups to a business intelligence front-end, the link groups being usable by the business intelligence front-end to assist users in querying the objects of the universe.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to exposing object relationships that can be determined for a universe. The object relationships can be used to guide a user in creating meaningful queries. For example, the object relationships inform the user of objects that are related to one another in an effort to inhibit the user from selecting incompatible objects, e.g., in a query.

In accordance with implementations of the present disclosure, object relationships are provided through link groups. In some examples, a link group is a set of objects, where objects in the set of objects have some relationship to one another. In some implementations, link groups can include semantic link groups and data link groups. In some examples, a semantic link group is provided based on a semantic model of the particular universe, the semantic model expressing object relationships, e.g., dimension-attribute relationships. In some examples, a data link group is provided based on a foundation model, e.g., universe data foundation model, the foundation model expressing object relationships in underlying databases, e.g., dimension-dimension relationships, dimension-measure relationships.

Implementations of the present disclosure further enable users to create queries on top of universes using link groups.

For example, a user can interact with a reporting tool, e.g., SAP Lumira provided by SAP AG of Walldorf, Germany, to create queries based on link groups. In some implementations, the user can display the universe based on sets of link groups. For example, content of link groups can be displayed. In some examples, a semantic link group can be displayed with a data link group, if a dimension included in the semantic link group is also included in the data link group. In such examples, all objects in the same link group are guaranteed to be compatible. In some examples, the user can be prevented from selecting objects that are determined not to be compatible with selected objects. In some examples, indicators, e.g., highlighting, can be applied to objects that are determined not to be compatible with selected objects. In some examples, indicators, e.g., highlighting, can be applied to objects that are determined to be compatible with selected objects.

In the context of the present disclosure, an object includes an array of data categorized into one or more dimensions. For example, and as discussed in further detail herein, an object can be a representation of a multi-dimensional spreadsheet, e.g., a multi-dimensional dataset including a plurality of data tables. In some examples, a dimension of an object defines a category of stored data. In some examples, an object includes a plurality of cells, where cells are populated with respective values, e.g., number, text. In some examples, each value represents some measure, e.g., of a business, such as sales, revenue, profits, expenses, budget and forecast. In some examples, each measure is a fact, e.g., a numerical fact, a textual fact.

Figure 1:
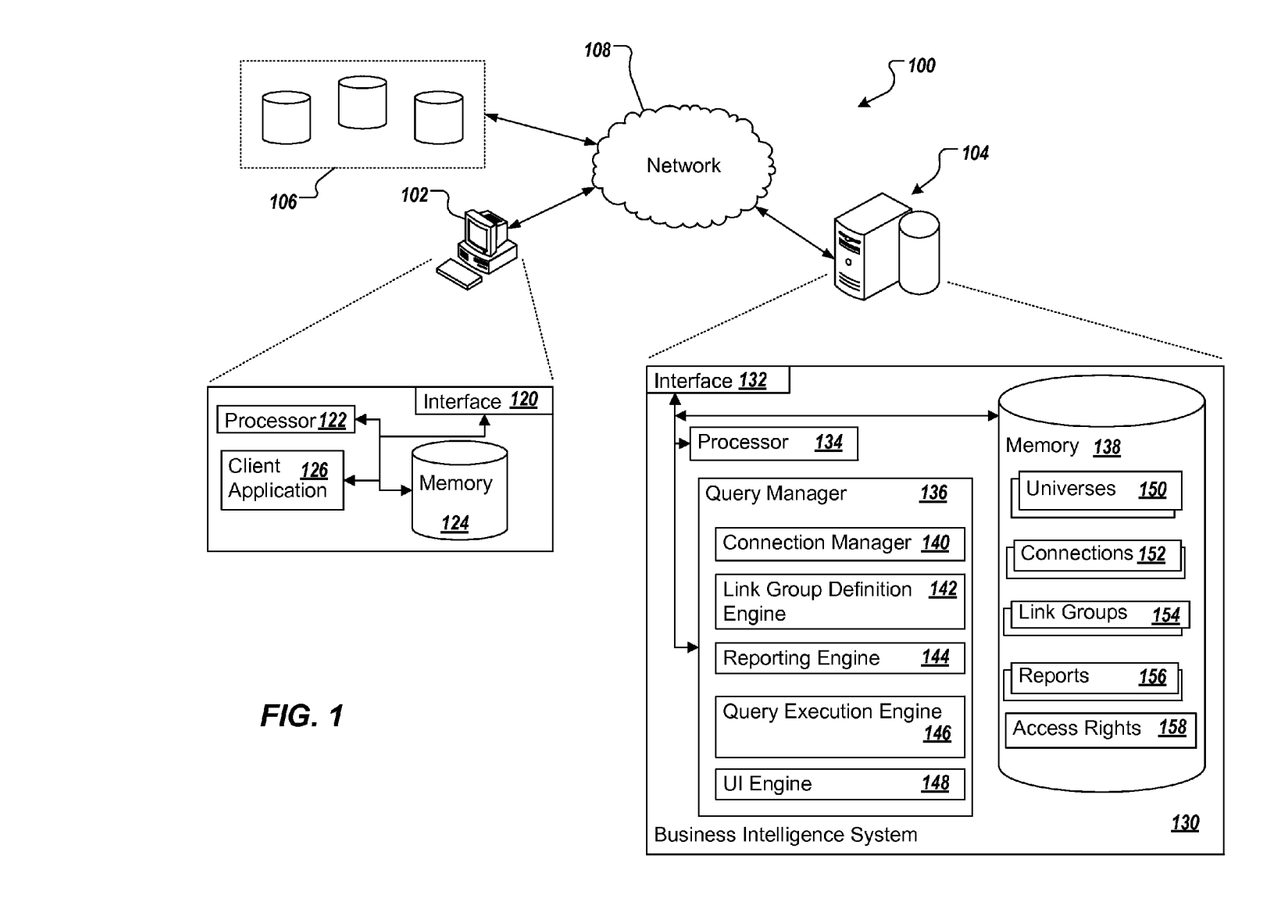
FIG. 1 depicts an example high-level architecture in accordance with implementations of the present disclosure.

FIG. 1 depicts an example high-level architecture 100 in accordance with implementations of the present disclosure. More particularly, implementations of the present disclosure can be realized in the example architecture 100. The example architecture 100 includes a client computing device 102, a server system 104, one or more data sources 106, and a network 108. In some examples, a user (not shown) can use the client computing device 102 to interact with the server system 104. For example, the computing device 102 can communicate with the server system 104 over the network 108.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 includes an interface 120, one or more processors 122, memory 124, and one or more client applications 126. In some examples, the interface 120 is used by the computing device 102 for communicating with other devices and/or systems through the network 108. In some examples, the interface 120 includes logic encoded in software and/or hardware in a suitable combination and operable to communicate with the network 108. More specifically, the interface 120 can include software supporting one or more communication protocols associated with communications such that the network 108 or interface's hardware is operable to communicate physical signals within and outside of the illustrated architecture 100.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems. In some implementations, the server system 104 is representative of various forms of servers including, but not limited to a web server, an application server, a proxy server, a network server, and/or a server pool. In general, the server system 104 accepts user requests for application services and provides such services to any number of client devices, e.g., the computing device 102, over the network 108. In some implementations, the server system 104 can provide a central point through which service-providers can manage and access data related to web services.

In accordance with implementations of the present disclosure, the server system 104 provides a business intelligence system 130. In some examples, the business intelligence system 130 can be provided by a server, computer, or plurality of servers or computers capable of performing functions associated with creation, modification, and use of link groups. In some examples, the business intelligence system 130 can be part of an end-to-end enterprise resource planning (ERP) system, or an analytics system. In some examples, the business intelligence system 130 can be a dedicated system for creating and managing link groups. In some examples, the business intelligence system 130 can be a cloud-based system providing services to a plurality of systems.

At a high level, the business intelligence system 130 is provided through an electronic computing device operable to receive, transmit, process, store, or manage data and information associated with the example architecture 100. In some examples, the business intelligence system 130 is communicably coupled with at least one client, e.g., the computing device 102. For example, one or more link groups can be provided to a user interacting with the computing device 102, and the user can use the link groups to submit queries, as discussed in further detail herein.

In the depicted example, the business intelligence system 130 includes an interface 132, one or more processors 134, a query manager 136, and memory 138. The query manager 136 can include a connection manager 140, a link group definition engine 142, a reporting engine 144, a query execution engine 146, and a user interface (UI) engine 148. In some examples, the memory 138 can store one or more universes 150, one or more connections 152, one or more link groups 154, one or more reports 156, and access rights 158. In some implementations, the one or more link groups 154 can be determined on-the-fly, e.g., in response to a request for link groups, and might not be permanently persisted in memory. In such examples, the memory 138 can include random access memory (RAM) to temporarily persist the one or more link groups 154.

In some examples, the interface 132 is used by the business intelligence system 130 for communicating with other data sources, devices and/or systems through the network 108. Generally, the interface 132 includes logic encoded in software and/or hardware in a suitable combination and operable to communicate with the network 108. More specifically, the interface 132 can include software supporting one or more communication protocols associated with communications such that the network 108 and/or interface's hardware is operable to communicate physical signals within and outside of the example architecture 100.

In some examples the processor(s) 134 can be a central processing unit (CPU), a blade, an application specific integrated circuit (ASIC), a field-programmable gate array (FPGA), or another suitable component. Generally, the processor(s) 134 can execute instructions and manipulates data to perform the operations of the business intelligence system 130. Specifically, the processor(s) 108 can execute the functionality required to receive and respond to queries, as well as to perform operations associated with the query manager 136, and the business intelligence system 130 as a whole.

In some implementations, the query manager 136, as well as its components, can be any application, program, or other software for managing and performing operations associated with queries and link groups, as discussed herein. In general, components of the query manager 136, as well as any other or alternative components, assist the query manager 136 in creating, modifying, or otherwise providing link groups, as discussed herein. For example, the connection manager 140 and link group definition engine 142, as well as suitable functionality of the query manager 136 as a whole, can be used to create or edit link groups. In some examples, the connection manager 140 can be used to identify one or more data sources, e.g., the data sources 106, available to be associated with and used for link group generation. In some examples, the connection manager 140 can identify defined universes, databases, other relational or multi-dimensional databases, and/or specific files and documents to be used for link group generates.

Universes, e.g., universes 150, can be provided as defined semantic layers residing between data sources and the end user, and can act as a business representation of a data warehouse or transaction database. In general, universes enable users to interact with data without requiring detailed and technical understanding and knowledge of the particular data source. In some examples, universes can include a connection parameter to a single data structure, SQL structures (or objects) that map to actual SQL structures in the databases, and a schema of the tables and joins from the database. In some examples, objects created for the universe should be relevant to the user's business environment to provide a business-focused entry to the database structures. The universes can be created by database or technical experts, or they may be created automatically by suitable systems after particular aspects of interest are defined by users.

In some examples, the UI engine 148 can be used to provide appropriate UI screens and elements for providing link groups, e.g., for use in constructing queries. For example, a UI can be provided to enable users to construct one or more queries. In some examples, a list of objects can be displayed, from which a user can select objects for use in a query. In accordance with implementations of the present disclosure, the list of objects can be affected based on link groups. For example, the user can select an object for use in the query. In some examples, link groups can be reviewed to determine other objects that are related to the selected object, and the list of objects can be altered based on the relationships. For example, objects that are related to the selected object can be highlighted in the list of objects to encourage the user to select highlighted objects for use in the query. As another example, objects that are not related to the selected object can be filtered from the list of objects to prevent the user from selecting unrelated objects for use in the query.

Implementations of the present disclosure are discussed with reference to a data foundation, a business layer, and a semantic layer. In some examples, the data foundation is provided as the underlying database model used by the universe. An example data foundation can include the tables, joins and contexts used by the universe. In some examples, the business layer can be referred to as an abstracted layer, and includes a list of objects and folders exposed by the universe. The business layer is abstracted in that it does not include technical detail to obscure technical complexity that might be meaningless to some users, e.g., non-technical users. That is, technical data, e.g., metadata, that could define relationships between tables the objects reference is not surfaced before exposing objects at the business layer. Accordingly, implementations of the present disclosure enable automatic reconstruction of at least some technical data starting from the business layer to provide link groups, as discussed herein. In some examples, the semantic layer maps complex data, e.g., of the data foundation, to familiar (non-technical) terms, e.g., business terms, of the business layer. Use of familiar terms simplifies the complexity of the underlying data, and enables non-technical users to better explore and understand the data.

Figure 2:
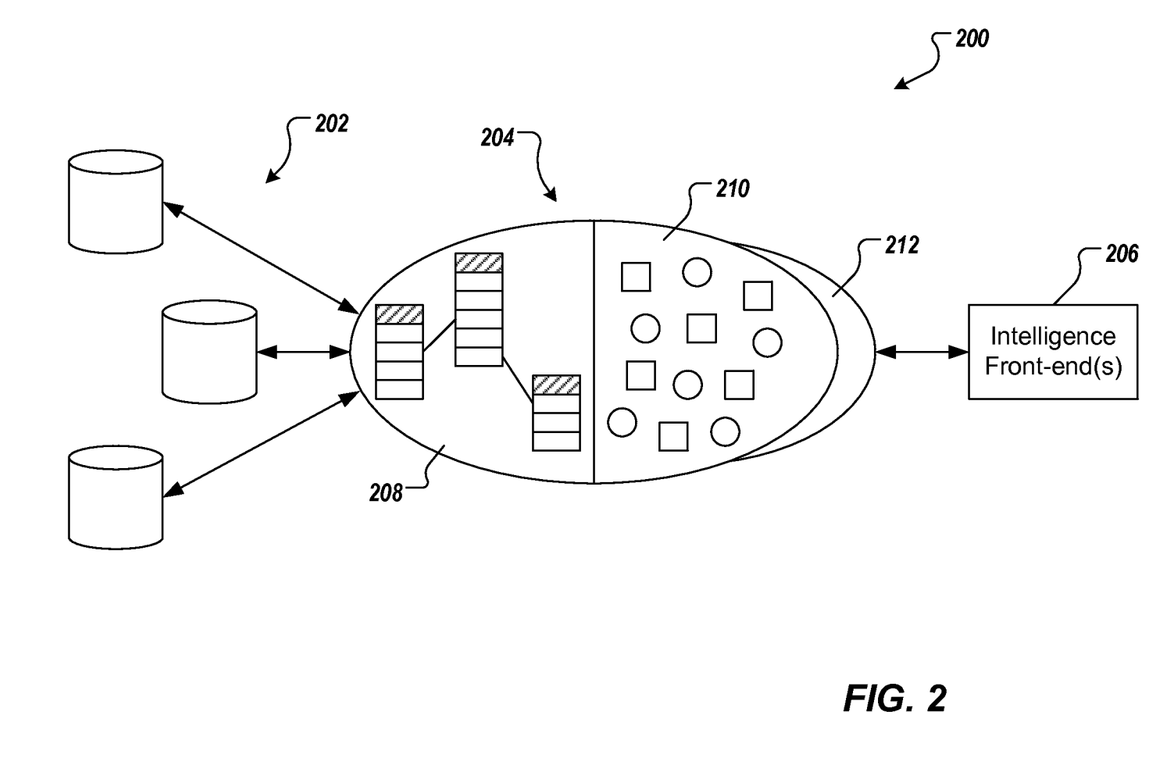
FIG. 2 depicts an example universe architecture.

FIG. 2 depicts an example universe architecture 200. In the depicted example, the universe architecture 200 includes data sources 202, a semantic layer 204, and one or more intelligence front-ends 206. In some examples, the semantic layer is provided for a universe. In some examples, the one or more intelligence front-ends can include query/analysis applications, dashboards, data visualizations, and/or reporting applications. In some examples, the semantic layer 204 includes a data foundation 208, a business layer 210, and an information engine 212. In general, the semantic layer 204 eases access to and analysis of data provided in data sources, regardless of the underlying data source, e.g., multi-dimensional expression (MDX), web service description language (WSDL), structured query language (SQL).

Implementations of the present disclosure will be discussed in further detail herein with reference to an example context. The example context includes data sources that include one or more data tables. It is appreciated, however, that implementations of the present disclosure can be provided in any other appropriate context, e.g., data sources that include any other appropriate data structure.

As introduced above, implementations of the present disclosure are directed to providing link groups, each link group representing object relationships that can be determined for a universe. In some examples, a link group is a set of objects, where objects in the set of objects have some relationship to one another. In some implementations, link groups can include semantic link groups and data link groups. In some examples, a semantic link group is provided based on a semantic model of the particular universe, the semantic model expressing object relationships, e.g., dimension-attribute relationships. In some examples, a data link group is provided based on a foundation model, the foundation model expressing relationships, e.g., dimension-dimension relationships, dimension-measure relationships, on the tables of underlying databases on which objects are built.

In further detail, implementations of the present disclosure provide link groups including objects that share the same dimensionality around measures, and/or that are compatible within the universe. In some implementations, a semantic layer, e.g., the semantic layer 204, returns relationship information under the notion of the link group, also referred to as universe link group. As introduced above, a link group is defined as a set of objects, e.g., business objects, that are linked together through common dependency criteria based on a universe semantic model and/or based on a data foundation model. In some examples, the semantic layer determines link groups based on semantic link group determination, and/or based on data link group determination. In some examples, semantic link group determination includes browsing of all business layer items or objects in order to create link groups based on object-relationships, e.g., dimension-attribute relationships. In some examples, data link group determination includes browsing all data foundation entities, e.g., the data foundation and its tables, columns, joins, in order to create data link groups expressing object-relationships, e.g., dimension-dimension and/or dimension-measure relationships.

In some implementations, a set of rules can be applied to link groups. An example rule can provide that a data link group can include only groups of dimensions and measures, while a semantic link group must include one dimension and zero or more attributes associated to this dimension. Another example rule can provide that a data link group can be provided as a measure group, if it contains at least one measure. Another example rule can provide that a link group cannot be included in another link group, but link groups can have dimensions and/or measures in common. Another example rule can provide that a universe includes at least one link group, otherwise the universe is in fact empty.

In accordance with implementations of the present disclosure, link groups can be provided automatically, and can be dynamically computed from the universe data foundation and business layer. More specifically, objects of the business layer can be automatically processed in view of the data foundation to automatically provide the link groups without human action or intervention. For example, actions discussed herein, e.g., with reference to FIGS. 3-6, can be performed automatically without human action or intervention. Consequently, and in accordance with the present disclosure, link groups need not be provided by a universe designer.

In some implementations, one or more processes can be executed at the semantic layer to provide link groups for a particular universe. In some examples, a link group definition engine, e.g., the link group definition engine 142 of FIG. 1, can perform functionality discussed herein.

As discussed in further detail below, and for a given universe, link groups are provided based on a business layer model and a data foundation of the universe. In some implementations, and in the example context provided above, for each object defined in the business layer of the universe, the object is mapped to corresponding data tables in the data foundation. In some implementations, for each dimension in the business layer, a semantic link group is created, if there is one or more attributes associated with the dimension, the semantic link group including the dimension and its attribute(s).

In some implementations, for each context defined in the data foundation of the universe, we create a data link group. All objects based on the tables of this context are added to this context.

In some implementations, the data foundation is reviewed to identify one or more tables that have not yet been processed for link group generation. In some examples, for each unprocessed table, it can be determined whether the table is a fact table. In some examples, a table is determined as a fact table if each row of the table matches one and only one row in other tables, or if each row in other tables matches one or more rows in the table. A data link group is created for the fact table. All the objects in the universe's business layer that rely on this fact table are selected, and are included in the data link group. Further, for each table that has a join with the fact table, if there are some objects in the business layer that are based on the table, the objects are added to the data link group. This is recursively repeated with tables, where each row of the last processed table matches one and only one row in this table, or if each row in other tables matches one or more rows in this last processed table. In this manner, beginning with the fact table, a chain of tables can be processed to add objects to the data link group of the fact table.

All link groups, both data link groups and semantic link groups that have been created for the universe are returned. The link groups can be used to assist users in constructing queries, for example, as discussed herein.

Figure 3:
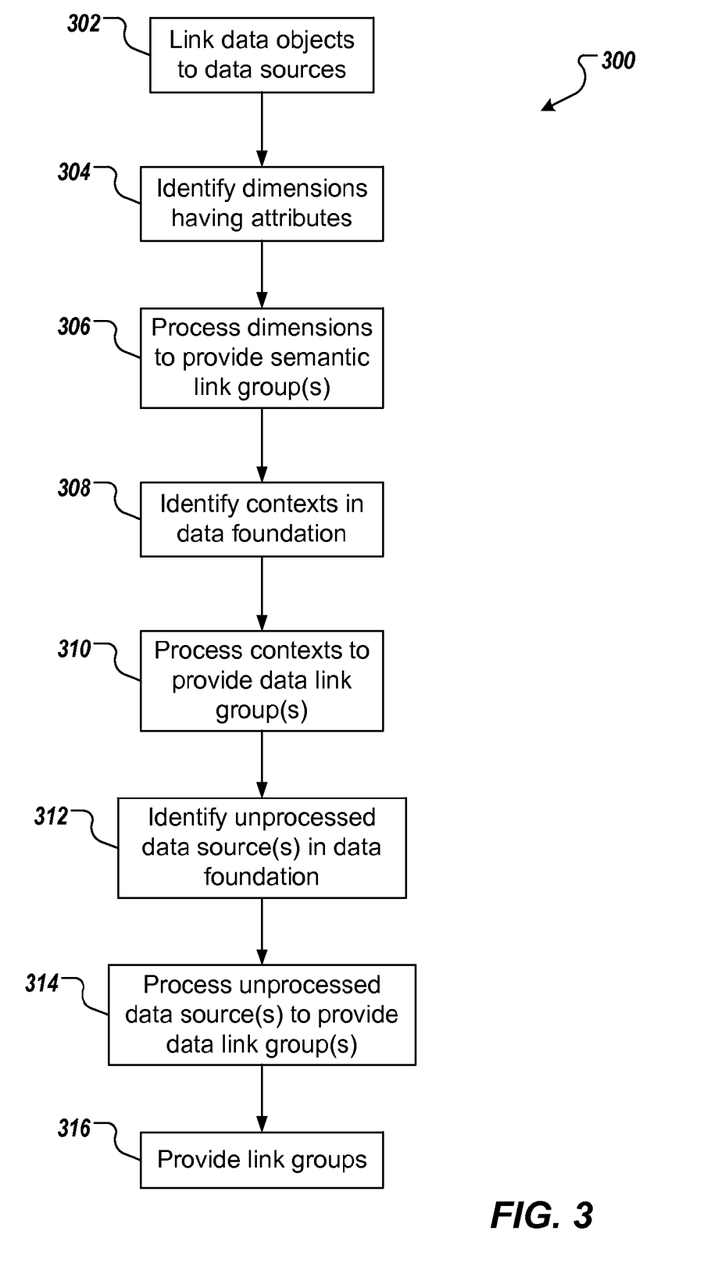
FIGS. 3-6 depict example processes that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the example process 300 is executed for a universe of objects, e.g., business objects.

For the universe, the objects are linked to data sources of an underlying data foundation (302). One or more dimensions of the universe are identified (304). For example, m dimensions (D) can be identified, where m≥1. The dimensions are processed to provide one or more semantic link groups (306). Example processing of dimensions is discussed in further detail herein with reference to FIG. 4. One or more contexts of the universe are identified (308). For example, p contexts (C) can be identified, where p≥1. Each context is processed to provide one or more data link groups (310). Example processing of contexts is discussed in further detail herein with reference to FIG. 5. In some examples, it can be determined that no contexts are provided for the data foundation, i.e., p=0. One or more unprocessed data sources, e.g., tables, within the data foundation are identified (312). For example, q data sources (DS) can be identified, where q≥1. In some examples, an unprocessed data source includes a data source of the data foundation that has not been processed for providing link groups. The unprocessed data sources are processed to provide one or more data link groups (314). Example processing of unprocessed data sources is discussed in further detail herein with reference to FIG. 6. In some examples, it can be determined that there are no unprocessed data sources for the data foundation, i.e., q=0. Identified link groups are provided (316). In some examples, the link groups are provided to a business intelligence front-end and can be used to assist users in querying the universe.

Figure 4:
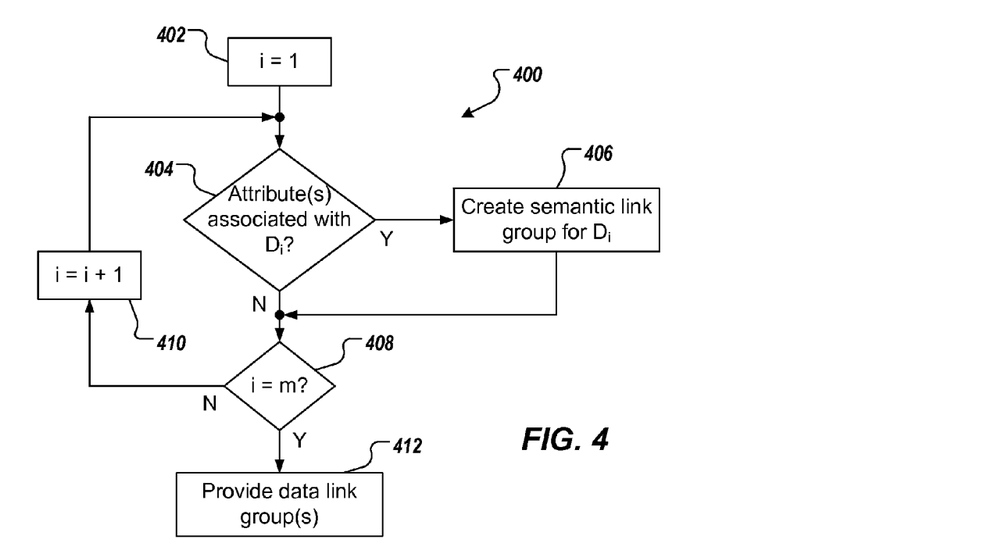

FIG. 4 depicts an example process 400 that can be executed in accordance with implementations of the present disclosure. In some examples, the example process 400 can be provided as one or more computer-executable programs executed using one or more computing devices. In some examples, the example process 400 is executed to provide one or more semantic link groups based on dimensions.

A counter i is set equal to 1 (402). It is determined whether one or more attributes are associated with dimension $D_i$ (404). If one or more attributes are associated with the dimension $D_i$, a semantic link group is created for the dimension $D_i$ (406). As discussed above, the semantic link group includes the dimension $D_i$ and the one or more attributes associated therewith. It is determined whether the counter i is equal to m (408). That is, it is determined whether all dimensions identified for the universe have been considered. If i is not equal to m, the counter i is incremented (410), and the example process 400 loops back. If i is equal to m, the semantic link groups are provided (412). For example, the semantic link groups can be provided to a business intelligence front-end.

Figure 5:
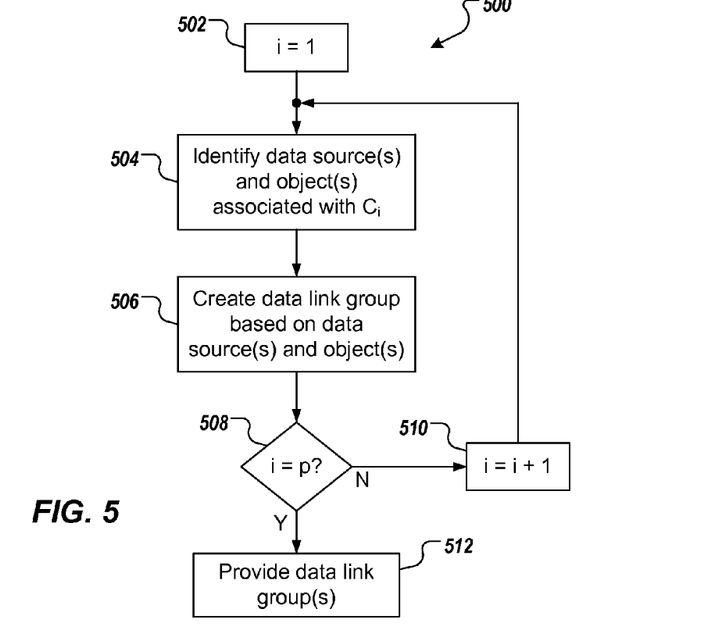

FIG. 5 depicts an example process 500 that can be executed in accordance with implementations of the present disclosure. In some examples, the example process 500 can be provided as one or more computer-executable programs executed using one or more computing devices. In some examples, the example process 500 is executed to provide one or more data link groups based on contexts.

A counter i is set equal to 1 (502). One or more data sources and one or more objects associated with the context $C_i$ are identified (504). A data link group is created based on the one or more data sources and the one or more objects (506). For example, and as discussed in further detail above, for each table in the context, a table is determined to be a fact table if each row of the table matches one and only one row in other tables, or if each row in other tables matches one or more rows in the table, and a data link group is defined for the fact table. All objects based on the fact table are included in the data link group (even objects that are also based on other tables). Further, for each table that has a join with the fact table, if there are some objects in the business layer that are based on the table, the objects are added to the data link group. This is recursively repeated with tables, where each row of the last processed table matches one and only one row in the table, or if each row in other tables matches one or more rows in the last processed table. It is determined whether the counter i is equal to p (508). That is, it is determined whether all contexts provided for the universe have been considered. If i is not equal to p, the counter i is incremented (510), and the example process 500 loops back. If i is equal to p, the data link groups are provided (512). For example, the data link groups can be provided to a business intelligence front-end.

Figure 6:
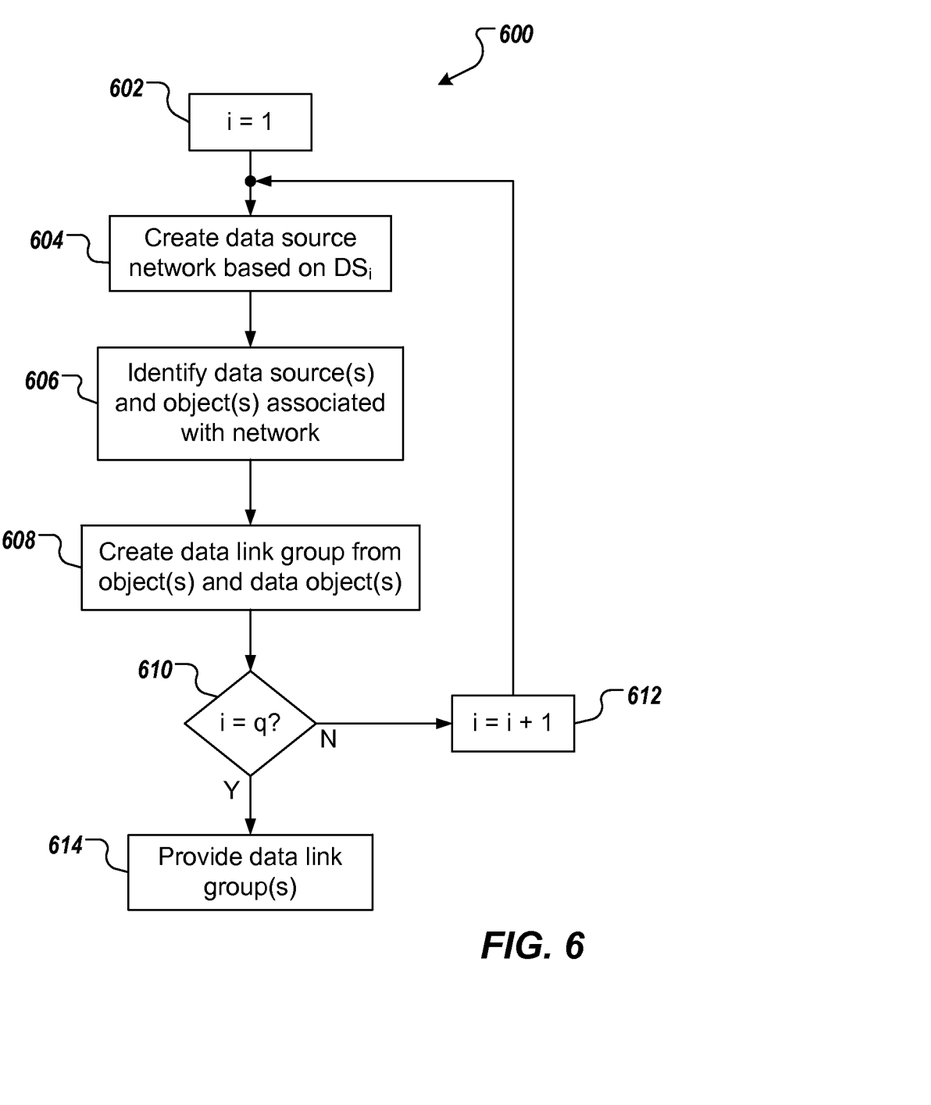

FIG. 6 depicts an example process 600 that can be executed in accordance with implementations of the present disclosure. In some examples, the example process 600 can be provided as one or more computer-executable programs executed using one or more computing devices. In some examples, the example process 600 is executed to provide one or more semantic link groups based on unprocessed data sources.

A counter i is set equal to 1 (602). A data source network is provided based on the data source $DS_i$, e.g., a table (604). In some examples, the data source network includes other data sources, e.g., tables, that are joined with the data source $DS_i$. One or more data sources and one or more objects associated with the data source network are identified (606). A data link groups is created and include the identified one or more data sources and one or more objects (608). It is determined whether the counter i is equal to q (610). That is, it is determined whether all unprocessed data sources of the universe have been considered. If i is not equal to q, the counter i is incremented (612), and the example process 600 loops back. If i is equal to q, the data link groups are provided (614). For example, the data link groups can be provided to a business intelligence front-end.

Figure 7:
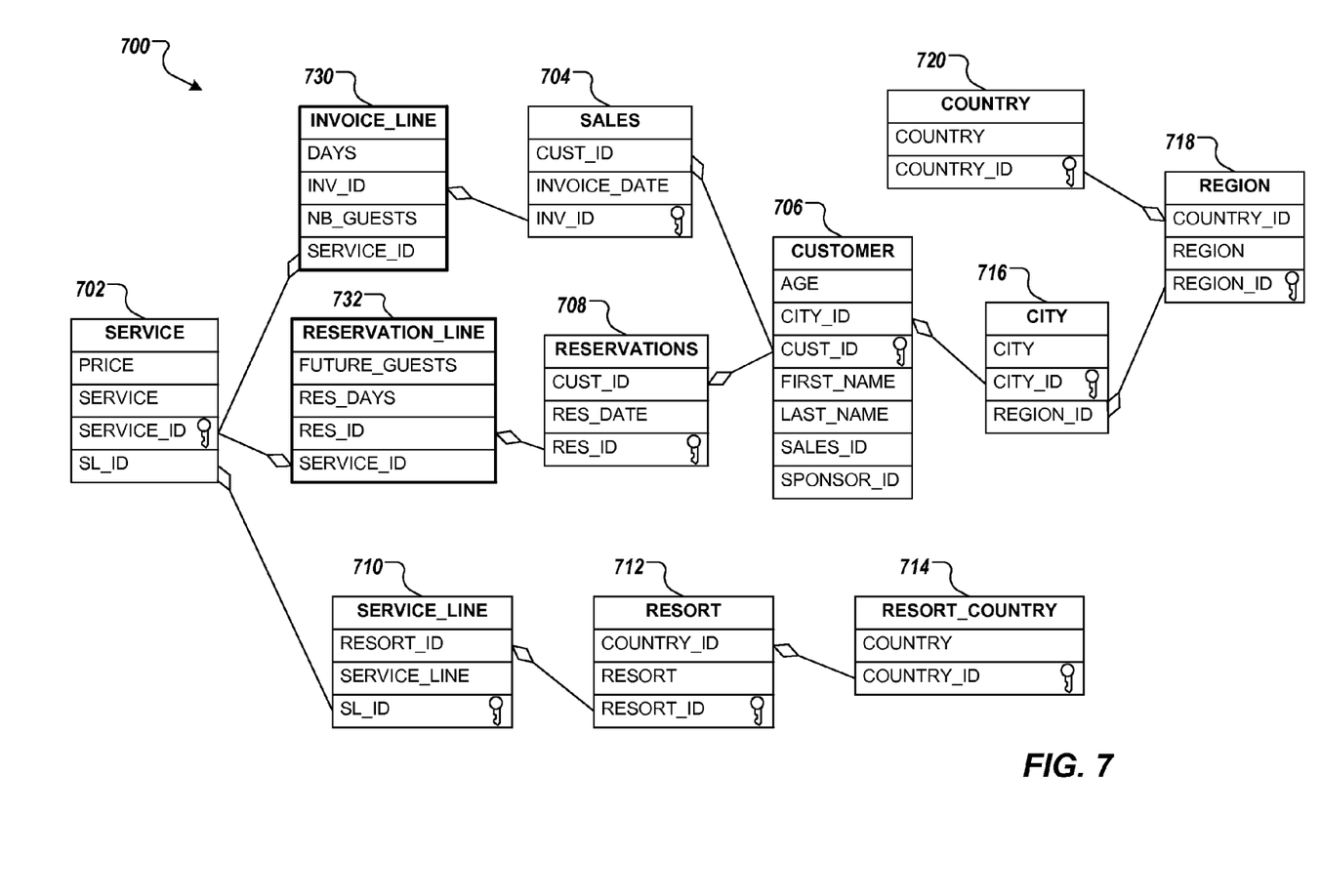
FIGS. 7 and 8 depict an example use case in accordance with implementations of the present disclosure.
Figure 8:
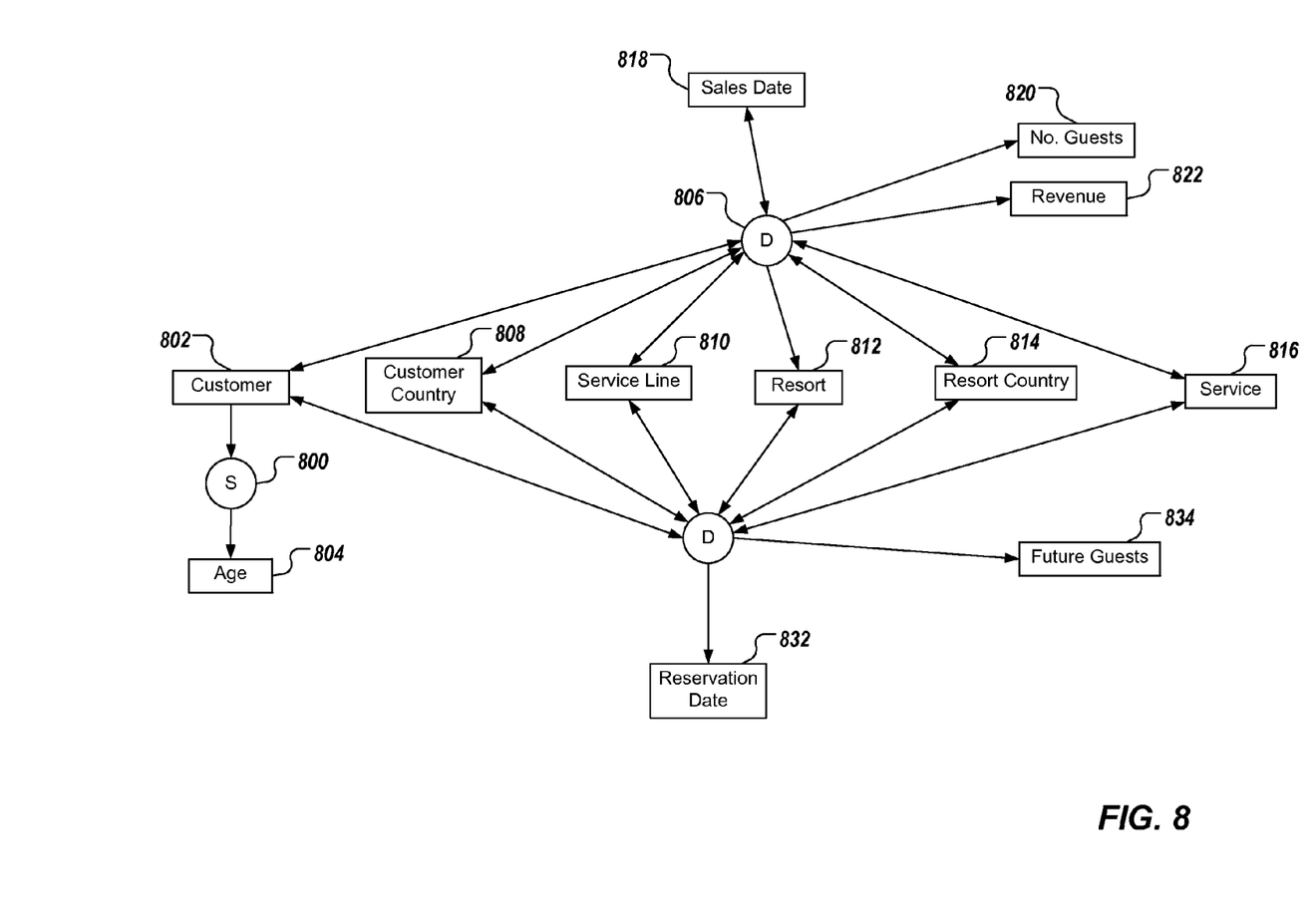

FIGS. 7 and 8 depict an example use case in accordance with implementations of the present disclosure. More particularly, FIG. 7 depicts an example data foundation 700. The example data foundation 700 includes a dimension table 702 (SERVICE), a dimension table 704 (SALES), a dimension table 706 (CUSTOMER), a dimension table 708 (RESERVATIONS), a dimension table 710 (SERVICE_LINE), a dimension table 712 (RESORT), a dimension table 714 (RESORT_COUNTRY), a dimension table 716 (CITY), a dimension table 718 (REGION), and a dimension table 720 (COUNTRY). The example data foundation 700 also includes a fact table 730 (INVOICE_LINE) and a fact table 732 (RESERVATION_LINE).

In this example, contexts can be included, e.g., to resolve the loop including tables 702, 704, 706, 708, 730, 732. In the depicted example, a Sales context can be provided and can include the tables 702, 704, 706, 730, and a Reservations context can be provided and can include the tables 702, 706, 708, 732.

A business layer can be provided for the example data foundation 700. An example business layer can include objects, as provided in Table 1 below:

TABLE 1

Example Objects

| Object | Name | Description |
|---|---|---|
| Dimension | Resort Country | Dimension based on RESORT_COUNTRY alias table |
| Dimension | Resort | Dimension based on RESORT table |
| Dimension | Service Line | Dimension based on SERVICE_LINE table |
| Dimension | Service | Dimension based on SERVICE table |
| Dimension | Sales Date | Dimension based on INVOICE_LINE table |
| Dimension | Customer Country | Dimension based on COUNTRY table |
| Dimension | Customer | Dimension based on CUSTOMER table |
| Attribute | Age | Attribute of Customer based on CUSTOMER table |
| Dimension | Reservation Date | Dimension based on RESERVATION_LINE table |
| Measure | Revenue | Measure based on INVOICE_LINE table |
| Measure | Number of guests | Measure based on INVOICE_LINE table |
| Measure | Future guests | Measure based on RESERVATION_LINE table |

In accordance with implementations of the present disclosure, the objects of Table 1 can be processed in view of the data foundation 700 of FIG. 7 to provide one or more link groups, e.g., one or more semantic link groups, one or more data link groups. FIG. 8 depicts example link groups that can be provided. In the example of FIG. 8, a node 800 indicates a semantic link group providing a relationship between a dimension 802 (Customer) and an attribute 804 (Age). A node 806 indicates a data link group based on a first context (Sales context), and relationships between the dimension 802, a dimension 808 (Customer Country), a dimension 810 (Service Line), a dimension 812 (Resort), a dimension 814 (Resort Country), a dimension 816 (Service), a dimension 818 (Sales Date), a measure 820 (No. of Guests), and a measure 822 (Revenue). A node 830 indicates a data link group based on a second context (Reservation context), and relationships between the dimensions 802, 808, 810, 812, 814, 816, a measure 832 (Reservation Date), and a measure 834 (Future Guests).

Figure 9:
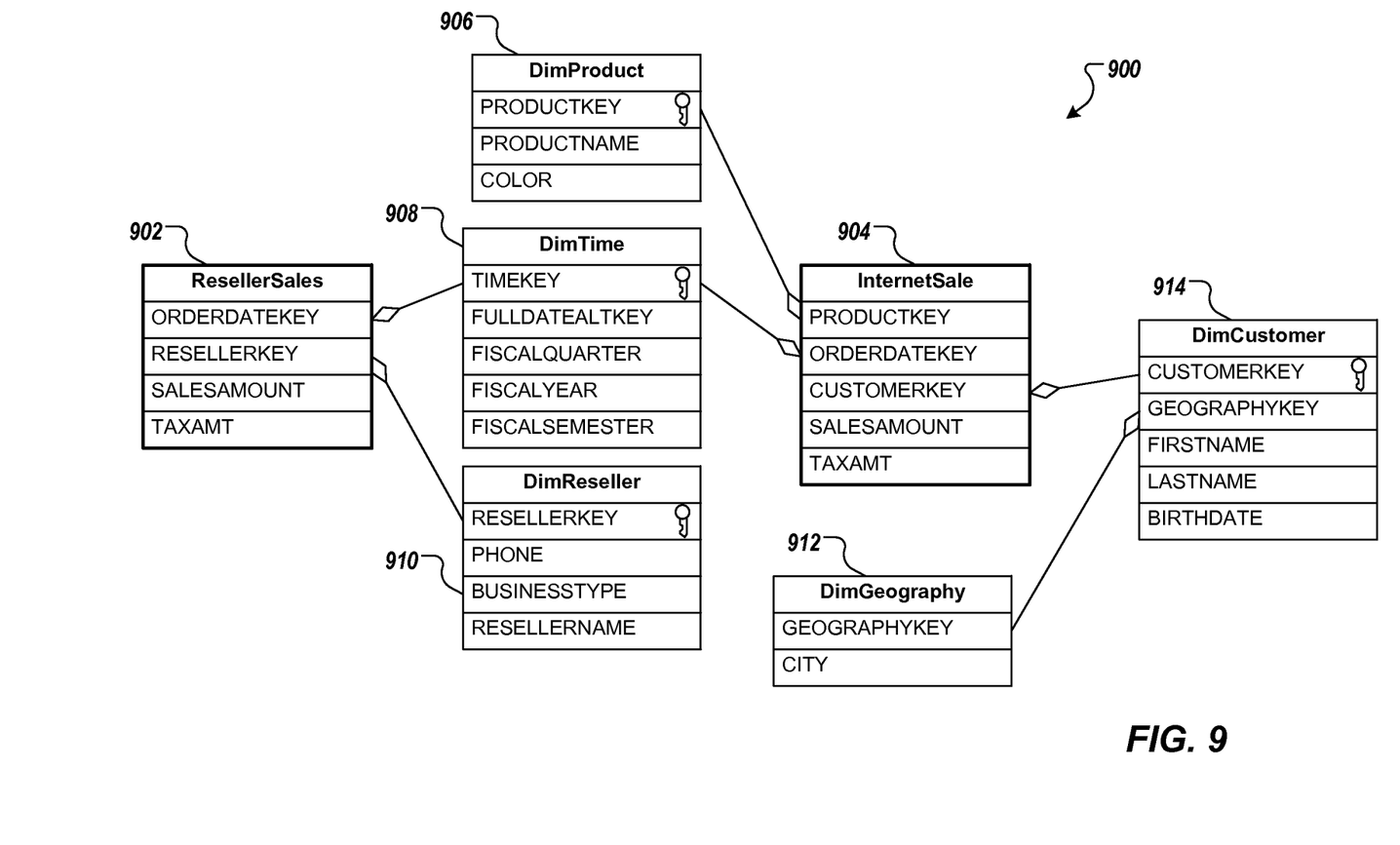
FIGS. 9 and 10 depict another example use case in accordance with implementations of the present disclosure.
Figure 10:
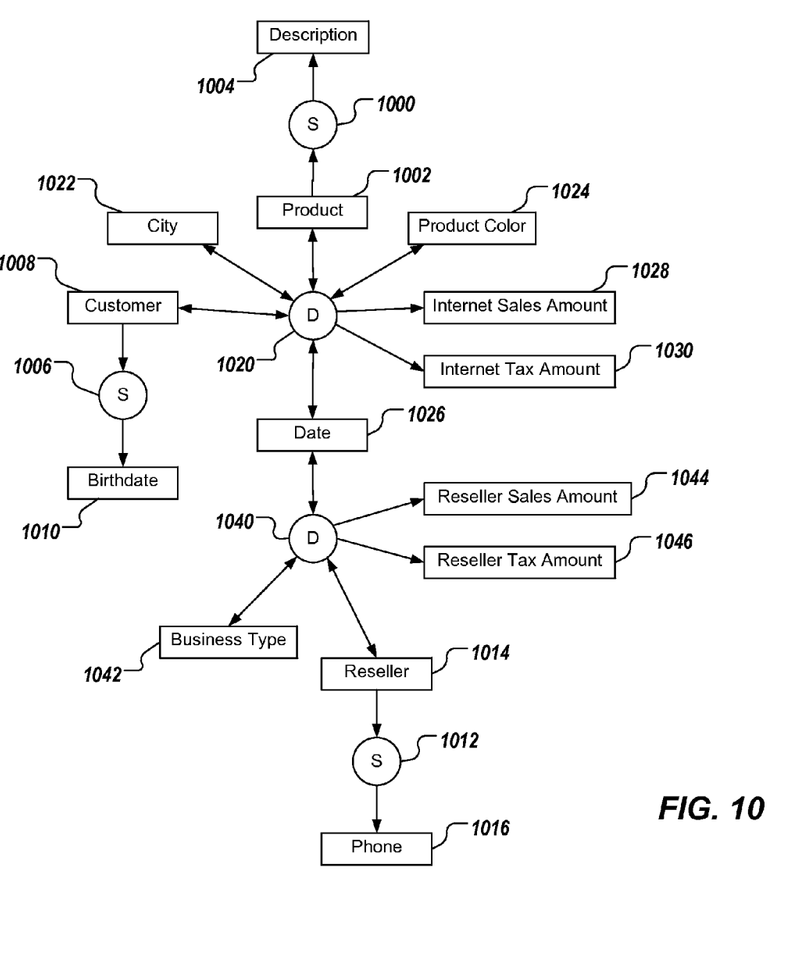

FIGS. 9 and 10 depict another example use case in accordance with implementations of the present disclosure. The example of FIGS. 9 and 10 is based on a universe that includes multiple fact tables and is without contexts. More particularly, FIG. 9 depicts an example data foundation 900. The example data foundation 900 includes a fact table (ResellerSales) 902, a fact table (InternetSales) 904, a dimension table (Product) 906, a dimension table (Time) 908, a dimension table (Reseller) 910, a dimension table (Geography) 912, and a dimension table (Customer) 914. In the depicted example, the dimension tables are joined to the fact tables, with the dimension table 908 being joined to both of the fact tables 902, 904.

A business layer can be provided for the example data foundation 900. An example business layer can include objects, as provided in Table 2 below:

TABLE 2

Example Objects

| Object | Name | Description |
|---|---|---|
| Dimension | Customer | Dimension based on DimCustomer table |
| Attribute | Birthdate | Attribute of Customer based on DimCustomer table |
| Dimension | City | Dimension based on DimCustomer table |
| Dimension | Product | Dimension based on DimProduct table |
| Attribute | Description | Attribute of Product based on DimProduct table |
| Dimension | Product Color | Dimension based on DimProduct table |
| Dimension | Date | Dimension based on DimTime table |
| Dimension | Business Type | Dimension based on DimReseller table |
| Dimension | Reseller | Dimension based on DimReseller table |
| Attribute | Phone | Attribute of Reseller based on DimReseller table |
| Measure | Internet Sales Amount | Measure based on FactInternetSales table |
| Measure | Internet Tax Amount | Measure based on FactInternetSales table |
| Measure | Reseller Sales Amount | Measure based on FactResellerSales table |
| Measure | Reseller Tax Amount | Measure based on FactResellerSales table |

In accordance with implementations of the present disclosure, the objects of Table 2 can be processed in view of the data foundation 900 of FIG. 9 to provide one or more link groups, e.g., one or more semantic link groups, one or more data link groups. FIG. 10 depicts example link groups that can be provided. In the example of FIG. 10, a node 1000 indicates a semantic link group providing a relationship between a dimension 1002 (Product) and an attribute 1004 (Description), a node 1006 indicates a semantic link group providing a relationship between a dimension 1008 (Customer) and an attribute 1010 (Birthdate), and a node 1012 indicates a semantic link group providing a relationship between a dimension 1014 (Reseller) and an attribute 1016 (Phone). A node 1020 indicates a data link group providing relationship between the dimension 1002, the dimension 1008, a dimension 1022 (City), a dimension 1024 (Product Color), a dimension 1026 (Date), a measure 1028 (Internet Sales Amount), and a measure 1030 (Internet Tax Amount). A node 1040 indicates a data link group providing relationship between the dimension 1014, the dimension 1026, a dimension 1042 (Business Type), a measure 1044 (Reseller Sales Amount), and a measure 1046 (Reseller Tax Amount).

Implementations of the subject matter and the operations described in this specification can be realized in digital electronic circuitry, or in computer software, firmware, or hardware, including the structures disclosed in this specification and their structural equivalents, or in any appropriate combinations thereof. Implementations of the subject matter described in this specification can be realized using one or more computer programs, i.e., one or more modules of computer program instructions, encoded on computer storage medium for execution by, or to control the operation of, data processing apparatus, e.g., one or more processors. In some examples, program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. In some examples, the data processing apparatus can include special purpose logic circuitry, e.g., an FPGA (field programmable gate array) or an ASIC (application specific integrated circuit). In some examples, the data processing apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for exposing relationships between universe objects, the method being executed using one or more processors and comprising:
    identifying, by the one or more processors, a universe, the universe comprising a data foundation, an abstracted layer, and a semantic layer, the data foundation defining an underlying database model comprising a definition of tables, joins and contexts used by the universe, the abstracted layer comprising a list of objects and folders exposed by the universe and being configured to obscure a technical complexity defining relationships between tables referenced by the objects in the data foundation underlying the universe, each of the objects comprising an array of data categorized into one or more dimensions and being characterized by at least one of a dimension, an attribute and a measure, and the semantic layer mapping complex data of the data foundation to non-technical terms using an information engine that enables access to data and analysis of data independent of the underlying data source;
    automatically processing, by the one or more processors, the objects of the abstracted layer to provide one or more link groups, each link group comprising a plurality of objects that are related to one another;
    matching, by the one or more processors, the dimension-attribute relationships between the objects of each of the one or more link groups to determine a compatibility of the objects and to prevent a selection of one or more of the objects that are identified as being incompatible by applying indicators of the compatibility to corresponding objects; and
    outputting the one or more link groups to initiate querying of the universe.

2. The method of claim 1, wherein automatically processing the objects comprises mapping the objects of the universe to one or more data sources in the data foundation underlying the universe, the data foundation comprising the tables, joins and contexts used by the universe.

3. The method of claim 1, wherein automatically processing the objects comprises, for a dimension of an object, determining that one or more attributes are associated with the dimension, and in response, providing a link group based on the dimension and the one or more attributes.

4. The method of claim 3, wherein the link group comprises a semantic link group that provides at least one relationship between the dimension of one of the objects and the attribute of another one of the objects.

5. The method of claim 1, wherein at least one link group of the one or more link groups comprises a data link group.

6. The method of claim 5, wherein the at least one link group expresses at least one of a dimension-to-dimension relationship and a dimension-to-measure relationship.

7. The method of claim 1, wherein outputting the link groups comprises providing the link groups to a business intelligence front-end, the link groups being usable by the business intelligence front-end to assist users in querying the objects of the universe.

8. A non-transitory computer-readable storage medium coupled to one or more processors and having instructions stored thereon which, when executed by the one or more processors, cause the one or more processors to perform operations for exposing relationships between universe objects, the operations comprising:
   identifying a universe, the universe comprising a data foundation, an abstracted layer, and a semantic layer, the data foundation defining an underlying database model comprising a definition of tables, joins and contexts used by the universe, the abstracted layer comprising a list of objects and folders exposed by the universe and being configured to obscure a technical complexity defining relationships between tables referenced by the objects in the data foundation underlying the universe, each of the objects comprising an array of data categorized into one or more dimensions and being characterized by at least one of a dimension, an attribute and a measure, and the semantic layer mapping complex data of the data foundation to non-technical terms using an information engine that enables access to data and analysis of data independent of the underlying data source;
   automatically processing, by the one or more processors, the objects of the abstracted layer to provide one or more link groups, each link group comprising a plurality of objects that are related to one another;
   matching the dimension-attribute relationships between the objects of each of the one or more link groups to determine a compatibility of the objects and to prevent a selection of one or more of the objects that are identified as being incompatible by applying indicators of the compatibility to corresponding objects; and
   outputting the one or more link groups to initiate querying of the universe.

9. The computer-readable storage medium of claim 8, wherein automatically processing the objects comprises mapping the objects of the universe to one or more data sources in the data foundation underlying the universe, the data foundation comprising the tables, joins and contexts used by the universe.

10. The computer-readable storage medium of claim 8, wherein automatically processing the objects comprises, for a dimension of an object, determining that one or more attributes are associated with the dimension, and in response, providing a link group based on the dimension and the one or more attributes.

11. The computer-readable storage medium of claim 10, wherein the link group comprises a semantic link group that provides at least one relationship between the dimension of one of the objects and the attribute of another one of the objects.

12. The computer-readable storage medium of claim 8, wherein at least one link group of the one or more link groups comprises a data link group.

13. The computer-readable storage medium of claim 12, wherein the at least one link group expresses at least one of a dimension-to-dimension relationship and a dimension-to-measure relationship.

14. The computer-readable storage medium of claim 8, wherein outputting the link groups comprises providing the link groups to a business intelligence front-end, the link groups being usable by the business intelligence front-end to assist users in querying the objects of the universe.

15. A system, comprising:
   a computing device; and
   a computer-readable storage device coupled to the computing device and having instructions stored thereon which, when executed by the computing device, cause the computing device to perform operations for exposing relationships between universe objects, the operations comprising:
      identifying a universe, the universe comprising a data foundation, an abstracted layer, and a semantic layer, the data foundation defining an underlying database model comprising a definition of tables, joins and contexts used by the universe, the abstracted layer comprising a list of objects and folders exposed by the universe and being configured to obscure a technical complexity defining relationships between tables referenced by the objects in the data foundation underlying the universe, each of the objects comprising an array of data categorized into one or more dimensions and being characterized by at least one of a dimension, an attribute and a measure, and the semantic layer mapping complex data of the data foundation to non-technical terms using an information engine that enables access to data and analysis of data independent of the underlying data source;
      automatically processing, by the one or more processors, the objects of the abstracted layer to provide one or more link groups, each link group comprising a plurality of objects that are related to one another;
      matching the dimension-attribute relationships between the objects of each of the one or more link groups to determine a compatibility of the objects and to prevent a selection of one or more of the objects that are identified as being incompatible by applying indicators of the compatibility to corresponding objects; and
      outputting the one or more link groups to initiate querying of the universe.

16. The system of claim 15, wherein automatically processing the objects comprises mapping the objects of the universe to one or more data sources in the data foundation underlying the universe, the data foundation comprising the tables, joins and contexts used by the universe.

17. The system of claim 15, wherein automatically processing the objects comprises, for a dimension of an object, determining that one or more attributes are associated with the dimension, and in response, providing a link group based on the dimension and the one or more attributes.

18. The system of claim 17, wherein the link group comprises a semantic link group that provides at least one relationship between the dimension of one of the objects and the attribute of another one of the objects.

19. The system of claim 15, wherein at least one link group of the one or more link groups comprises a data link group that expresses at least one of a dimension-to-dimension relationship and a dimension-to-measure relationship.

20. The system of claim 15, wherein outputting the link groups comprises providing the link groups to a business intelligence front-end, the link groups being usable by the business intelligence front-end to assist users in querying the objects of the universe.

* * * * *